(12) United States Patent
Kim et al.

(10) Patent No.: US 8,306,359 B2
(45) Date of Patent: Nov. 6, 2012

(54) METHOD, TERMINAL, AND COMPUTER-READABLE RECORDING MEDIUM FOR TRIMMING A PIECE OF IMAGE CONTENT

(75) Inventors: Dae Sung Kim, Seoul (KR); Ji Hee Cheon, Seoul (KR); Jung Hee Ryu, Seoul (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/378,518

(22) PCT Filed: Oct. 29, 2010

(86) PCT No.: PCT/KR2010/007513
§ 371 (c)(1),
(2), (4) Date: Dec. 15, 2011

(87) PCT Pub. No.: WO2011/053036
PCT Pub. Date: May 5, 2011

(65) Prior Publication Data
US 2012/0093418 A1 Apr. 19, 2012

(30) Foreign Application Priority Data
Oct. 30, 2009 (KR) .................. 10-2009-0104637

(51) Int. Cl.
*G06K 9/36* (2006.01)
(52) U.S. Cl. ....................... 382/282; 382/286
(58) Field of Classification Search .................. 382/103, 382/173, 282, 286, 291
See application file for complete search history.

(56) References Cited

U.S. PATENT DOCUMENTS

| | | | |
|---|---|---|---|
| 2005/0220349 A1* | 10/2005 | Furuya et al. | 382/195 |
| 2010/0214445 A1* | 8/2010 | Chronqvist | 348/231.99 |
| 2010/0290673 A1* | 11/2010 | Miyashita | 382/103 |

FOREIGN PATENT DOCUMENTS

| | | |
|---|---|---|
| KR | 1020050033537 A | 4/2005 |
| KR | 1020060056721 A | 5/2006 |
| KR | 10-2009-0042381 A | 4/2009 |
| KR | 10-2009-0067913 A | 6/2009 |
| KR | 10-2009-0105374 A | 10/2009 |
| KR | 100926133 B1 | 11/2009 |

OTHER PUBLICATIONS

Gonzalez, et al. Digital Image Processing, 2nd Edition, Prentice-Hall, New Jersey 2002.

* cited by examiner

*Primary Examiner* — Andrew W Johns
(74) *Attorney, Agent, or Firm* — Husch Blackwell LLP

(57) ABSTRACT

The present invention relates to a method for applying a trimming operation to image. The method includes the steps of: detecting person and object; calculating area of face region and area of detected object and calculating distance between center of face region and that of image and distance between center of detected object and that thereof; and applying trimming operation to the object if area of detected object is by over a first prefixed percent larger than that of face, and applying trimming operation to the object if distance between center of detected object and that of image is a second prefixed value or less and distance between center of face and that of image is by over a third prefixed value larger than distance between center of detected object and that thereof.

20 Claims, 16 Drawing Sheets

METHOD, TERMINAL, AND COMPUTER-READABLE RECORDING MEDIUM FOR TRIMMING A PIECE OF IMAGE CONTENT

CROSS REFERENCE TO RELATED APPLICATIONS

This application is a U.S. National Phase Application of International Application PCT Application No. PCT/KR2010/007513 filed on Oct. 29, 2010, which claims the benefit of priority from Korean Patent Application No. 10-2009-0104637 filed on Oct. 30, 2009. The disclosures of International Application PCT Application No. PCT/KR2010/007513 and Korean Patent Application No. 10-2009-0104637 are incorporated herein by reference.

FIELD OF THE INVENTION

The present invention relates to a method, a terminal and a computer-readable recording medium for applying a trimming operation to an image content; and more particularly, to the method, the terminal and the computer-readable recording medium for allowing a user to more rapidly check a main person, a main object, etc. included in a number of image contents and at the same time to feel an interesting image effect by extracting only a specific region of the image content through a certain standard and providing a thumbnail function, a zoom function, a slide show function, etc. for the extracted region.

BACKGROUND OF THE INVENTION

As the number of files stored in a system such as a variety of terminals becomes generally increased, much time and effort is required to search a particular file. To reduce the time and effort consumed, a technology for creating and storing a thumbnail of a still image or an image content is widely used. If a thumbnail-size image is created, the time and effort consumed to search the particular file may be reduced because thumbnails of multiple image contents may be displayed on one screen at the same time. In particular, a mobile terminal with a relatively low capacity and a relatively slow processing speed or a program which stores and manages multiple image files may have more advantages by using image thumbnails. Due to the advantages, a function of expressing an image file in a thumbnail size is used.

If the whole image file is reduced in a thumbnail size, a resolution, however, becomes small. If the thumbnail size becomes smaller, it may be difficult to identify the content of the image file. Accordingly, a technology for creating a thumbnail by cutting and reducing only a distinctive part included in the image file rather than that for creating a thumbnail by reducing the whole image file has been used. In brief, if a thumbnail is created with respect to only a specific region in the image file which shows the best content thereof, a reduction percent becomes relatively smaller rather than a thumbnail created by reducing the whole file image, and therefore, it is easy to identify the image. Furthermore, it is easy to understand the content of the image file only by checking the thumbnail image because the distinctive part of the image file is included in the created thumbnail.

However, a method for finding the distinctive part in an image file is now merely a method for finding an object in the image file by analyzing a saturation histogram, etc. and judging the found object as the distinctive part. In general, image content may include a person and an object and in the case, the object may have a high possibility of being a background or a surrounding environment. In short, the person is important in the image content but according to the conventional method, there are concerns that all, regardless of the person and the object, are judged to be important regions. Furthermore, if several entities including persons or objects exist, there is a problem to judge all as important regions, regardless of their significance. Accordingly, even though an important region is extracted and a thumbnail is created based on the important region, it is not easy to identify the content of the image file through the created thumbnail.

For the reason, a technology for extracting a substantially distinctive part among various entities in the image content, i.e., the most important part in the image file, and creating the thumbnail based on the most important part is required. In addition, a technology for allowing a user to feel interest by providing the extracted part for the user in several methods must be developed.

SUMMARY OF THE INVENTION

It is, therefore, an object of the present invention to, solve all the problems mentioned above.

It is another object of the present invention to allow a user to more easily identify an important substance of an image content and feel interested in it by extracting a distinctive region of the image content through various standards and providing the extracted distinctive region for the user through various methods.

It is still another object of the present invention to extract a substantially important part as a distinctive region of the image content by detecting a type, a location, a size, etc. of an entity included in the image content and applying different standards depending on whether the detected entity is a person or an object and/or depending on a location, a size, etc. which the person and/or the object occupies on the image.

In accordance with one aspect of the present invention, there is provided a method for applying a trimming operation to an image content, including the steps of: (a) detecting a person and an object in the image content by using a face detection technology and an object detection technology; (b) calculating an area of a face region of the detected person and an area of a region of the detected object and calculating a distance between a central point of the face region of the detected person and that of the image content and a distance between a central point of the detected object and that thereof; and (c) applying the trimming operation to the object if the area of the region of the detected object is determined to be by over a first prefixed percent larger than that of the face region of the detected person, and applying a trimming operation to the object if the distance between the central point of the detected object and that of the image content is determined to be a second prefixed value or less and the distance between the central point of the face of the detected person and that of the image content is determined to be by over a third prefixed value larger than the distance between the central point of the detected object and that thereof.

In accordance with another aspect of the present invention, there is provided a method for applying a trimming operation to an image content, including the steps of: (a) detecting objects included in the image content by using an object detection technology; (b) calculating areas of regions of respective detected objects and calculating distances between central points of the respective detected objects and a specific point in the image content, if multiple objects are detected in the image content; and (c) performing the trimming operation according to (i) a standard for increasing a priority on a first object if an area of a region of the first object is determined to be by over a first prefixed percent larger than that of a region of a second object among the detected objects and (ii) another standard for increasing a priority on either the first or the second object, from which a distance to the specific point in the image content is shorter, by comparing the distances between central points of the first and the second objects and the specific point in the image content, and if the area of the region of the first object is by over a second prefixed percent larger than that of the region of the second object, the standard (ii) is ignored, where the second prefixed percent is set to be larger than the first prefixed percent.

In accordance with still another aspect of the present invention, there is provided a terminal for applying a trimming operation to an image content, including: a distinctive region extracting part for (i) detecting a person and an object in the image content by using a face detection technology and an object detection technology, (ii) calculating an area of a face region of the detected person and an area of a region of the detected object and calculating a distance between a central point of the face region of the detected person and that of the image content and a distance between a central point of the detected object and that thereof, and (iii) determining the region of the detected object as a distinctive region if the area of the region of the detected object is determined to be by over a first prefixed percent larger than that of the face region of the detected person, and determining the region of the detected object as a distinctive region if the distance between the central point of the detected object and that of the image content is determined to be a second prefixed value or less and the distance between the central point of the face of the detected person and that of the image content is determined to be by over a third prefixed value larger than the distance between the central point of the detected object and that thereof; a trimming performing part for performing the trimming operation on the image content based on the determined distinctive region; and a display part for providing a result of the trimming operation for a user.

In accordance with still another aspect of the present invention, there is provided a terminal for applying a trimming operation to an image content, including: a distinctive region extracting part for detecting an object included in the image content by using an object detection technology, calculating areas of regions of respective detected objects and calculating distances between central points of respective objects and a specific point in the image content, if multiple objects are detected in the image content, and determining distinctive regions according to (i) a standard for increasing a priority on a first object if an area of a region of the first object is determined to be by over a first prefixed percent larger than that of a region of a second object among the detected objects and (ii) another standard for increasing a priority on either the first and the second object, from which a distance to the specific point in the image content is shorter, by comparing the distances between central points of the first object and the second objects and the specific point in the image content, and if the area of the region of the first object is by over a second prefixed percent larger than that of the region of the second object, the standard (ii) is ignored, where the second prefixed percent is set to be larger than the first prefixed percent; a trimming performing part for performing the trimming operation on the image content based on the determined distinctive region; and a display part for providing a result of the trimming operation for a user.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
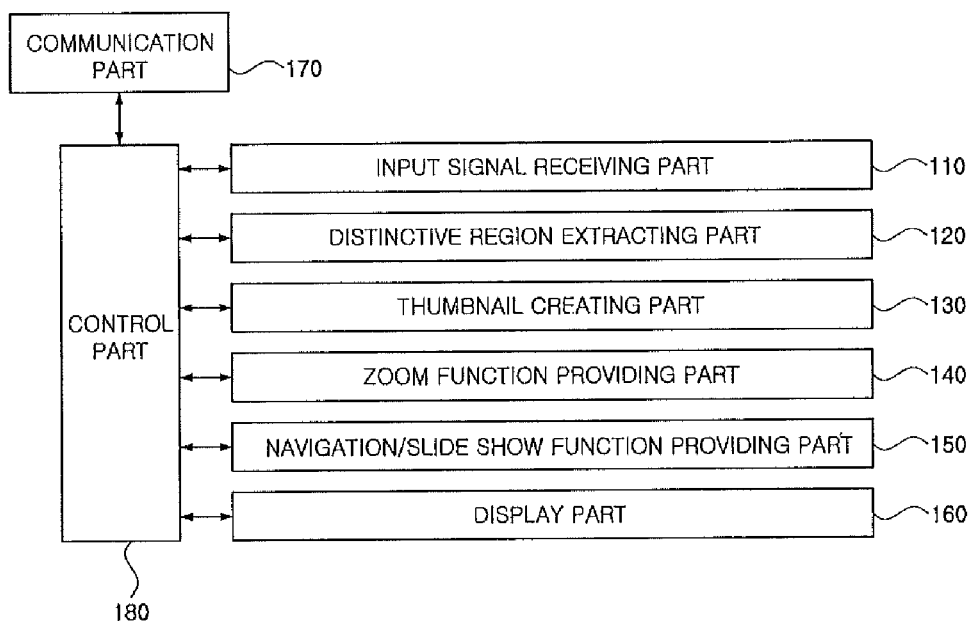
FIG. 1 is a diagram exemplarily illustrating an internal configuration of a terminal capable of applying a trimming operation to an image content and providing the result of the trimming operation for a user in accordance with an example embodiment of the present invention.

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The configurations of the present invention for accomplishing the objects of the present invention are as follows:

For reference, "trimming" in the present invention means a configuration of a screen of an image content, e.g., a photo, and a concept including a process of emphasizing only an distinctive part(s) of the image content through a method for emphasizing a main part, etc. and providing it for a user. In accordance with the present invention, as detailed examples of the trimming, a function of creating a thumbnail of the distinctive region in the image content, a function of zooming in or out, a function of navigation or a slide show, etc. are mentioned, but such a trimming method is not limited only to this. For example, any effect applicable based on the distinctive region may be included in the meaning of the trimming.

Configuration of Terminal

FIG. 1 is a diagram exemplarily illustrating an internal configuration of a terminal capable of applying a trimming operation to an image content and providing the result of the trimming operation for a user in accordance with an example embodiment of the present invention.

As illustrated in FIG. 1, a terminal in the present invention may include an input signal receiving part 110 which receives a command to perform an operation a user wants, a distinctive region extracting part 120 which extracts an important region in the image content, a thumbnail creating part 130 which creates a thumbnail by using the extracted distinctive region, a zoom function providing part 140 which zooms in or out the one or more extracted distinctive regions, a navigation/slide show function providing part 150 which provides a navigation or a slide show of the one or more distinctive regions, a display part 160, a communication part 170 and a control part 180.

In accordance with an example embodiment of the present invention, the input signal receiving part 110, the distinctive region extracting part 120, the thumbnail creating part 130, the zoom function providing part 140, the navigation/slide show function providing part 150, the display part 160, the communication part 170 and the control part 180 may be program modules embedded in the terminal 100. The program modules may be included in the terminal 100 in a form of an operating system, an application program module and other program modules and may also be stored on several memory devices physically. Furthermore, the program modules may be stored on remote memory devices communicable to the terminal 100. The program modules may include but not be subject to a routine, a subroutine, a program, an object, a component, and a data structure for executing a specific operation or a type of specific abstract data that will be described later in accordance with the present invention.

First, the input signal receiving part 110 in accordance with an example embodiment of the present invention performs a function of receiving a command inputted by a user. As explained later, the terminal 100 in the present invention may apply a trimming operation to image content inputted by the user or pre-stored. The user may input a command for starting the trimming operation, creating a thumbnail of a selected part as a distinctive region, zooming, performing a navigation or a slide show, etc. The input of such a command may be made through an input part (non-illustrated) generally embedded in the terminal 100 and the input signal receiving part 110 may perform a function of receiving the command inputted through the input part.

In accordance with an example embodiment of the present invention, the distinctive region extracting part 120 may conduct a function of extracting the distinctive region from the image content inputted by the user or pre-stored. The distinctive region means an important part of the image content which expresses the substance thereof best. After recognizing the image content, the distinctive region extracting part 120 may extract the distinctive region through several standards (for example, if the image content is recognized to include a person and an object, the region which includes the person is extracted as the distinctive region by granting a priority on the person). The distinctive region may be extracted in a shape of a rectangular frame but the shape is not limited to this. The operation of the distinctive region extracting part 120 will be explained in a detail later.

In accordance with an example embodiment of the present invention, the thumbnail creating part 130 may conduct a function of creating a thumbnail by using the distinctive region extracted by the distinctive region extracting part 120. As explained above, the distinctive region may be extracted in a shape of a rectangular frame. The thumbnail creating part 130 may create an image file with an appropriate resolution and an appropriate size at the user's option from such a frame and the thumbnail created in this way may be provided for the user through the display part 160. In short, after the distinctive region is extracted by the distinctive region extracting part 120, the user may input a command to create a thumbnail through the input part generally embedded in the terminal 100 and the command may lead the thumbnail creating part 130 to create the thumbnail by using the distinctive region. In accordance with an example embodiment of the present invention, the input part may be implemented by a method for using a touch screen, in which case a user interface may be provided to allow the user to determine whether s/he wants to create the thumbnail or not. As a technology for a operation of the thumbnail creating part 130, i.e., for creating a thumbnail file from the image content, a technology disclosed in "R. C. Gonzalez, R. E. Woods, Digital Image Processing, 2nd edition, prentice-Hall, Inc., New Jersey, 2002" may be applied.

In accordance with an example embodiment of the present invention, the zoom function providing part 140 may carry out a function of providing a zoom-in or a zoom-out of the distinctive region extracted by the distinctive region extracting part 120 and providing the result of the zoom-in or the zoom-out for the user. There may be one or more distinctive regions extracted by the distinctive region extracting part 120 and the result extracted as the distinctive regions may be provided for the user through the display part 160 being displayed on the image content. If there is only one distinctive region, the user may command the zoom-in or the zoom-out of the distinctive region. The command may be inputted through the input part generally embedded in the terminal 100. In accordance with an example embodiment of the present invention, the input part may be implemented in a method for using a touch screen, in which case the user may execute the zoom function for the extracted distinctive region by touching it. For an example, if the user touches the distinctive region once, the zoom-in function for the touched extracted distinctive region may be executed and if the user touches it twice, the zoom-out function for the touched extracted distinctive region may be performed. As another example, it may be possible to instruct a degree of zoom-in or zoom-out to be changed according to how long a touch lasts. Otherwise, a user interface with which the command for zoom-in or zoom-out is inputted may be provided for the user with the result of extracting the distinctive region and thereby the zoom-in or the zoom-out may be performed according to the command of the user inputted through the provided user interface. If there are n extracted distinctive regions (where n is a positive integer more than 1), the zoom-in or the zoom-out function for one or more distinctive regions selected by the user may be performed. The zoom-in or the zoom-out function for the one or more distinctive regions may be performed in a selected order or simultaneously. Even in the case, the selection of the user may be made by the input part. Because the selection method is same as that in case there is only one extracted distinctive region, the explanation will be omitted.

In accordance with an example embodiment of the present invention, the navigation/slide show function providing part 150 may display one or more distinctive regions extracted by the distinctive region extracting part 120 to the user in a form of the navigation function or the slide show function. Herein, the navigation function is a function of looking around the selected distinctive regions through a manual selection of the distinctive regions and the slide show function automatically provides information on images of the distinctive regions consecutively in a certain order without any manual selection. For the navigation function and/or the slide show function, the user interface may be offered to allow the user to input the command for the navigation function and/or the slide show function and the user may input the command to determine whether the navigation function and/or the slide show function will be received or not.

In accordance with an example embodiment of the present invention, the display part 160 may perform a function of providing a variety of visual effects provided by the distinctive region extracting part 120, the thumbnail creating part 130, the zoom function providing part 140, and the navigation/slide show function providing part 150 and states of diverse operations performed by the terminal 100 through an image processing process. The display part 160 may include a liquid crystal display (LCD), an organic light emitting diode (OLED) or other flat panel display.

In accordance with an example embodiment of the present invention, the communication part 170 may conduct a function of receiving and transmitting data between the terminal 100 and an external device, e.g., a server providing an application for the service.

Besides, the control part 180 in accordance with an example embodiment of the present invention may perform a function of controlling data flow among the input signal receiving part 110, the distinctive region extracting part 120, the thumbnail creating part 130, the zoom function providing part 140, the navigation/slide show function providing part 150, the display part 160 and the communication part 170. In short, the control part 180 in the present invention may control the flow of data from outside or among the components of the terminal 100 and thereby allow the input signal receiving part 110, the distinctive region extracting part 120, the thumbnail creating part 130, the zoom function providing part 140, the navigation/slide show function providing part 150, the display part 160 and the communication part 170 to perform their unique functions.

Below is a detailed explanation on a course of extracting the distinctive region(s) through a certain standard(s) in addition to a detailed configuration of the distinctive region extracting part 120.

Configuration of Distinctive Region Extracting Part 120

Figure 2:
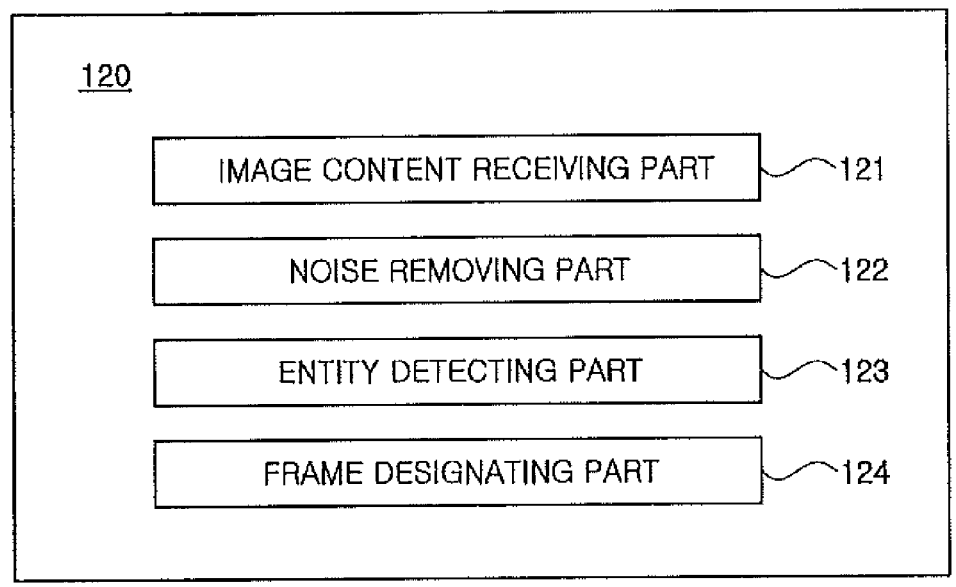
FIG. 2 is a diagram representing a configuration of a distinctive region extracting part in accordance with an example embodiment of the present invention.

FIG. 2 illustrates a configuration of the distinctive region extracting part 120 in accordance with an example embodiment of the present invention.

As illustrated in FIG. 2, the distinctive region extracting part 120 may include an image content receiving part 121, a noise removing part 122, an entity detecting part 123, and a frame designating part 124.

In accordance with an example embodiment of the present invention, the image content receiving part 121 may perform a function of receiving, from the user, an image content for the trimming process. The image content may be inputted by the user or pre-stored.

In accordance with an example embodiment of the present invention, the noise removing part 122 may perform a function of removing noise from the image content. More specifically, it may perform a function of reducing the noise from the image content by using a certain noise reduction filter. Herein, a smoothing process performed by using a general method, e.g., a Gaussian Filter, may be applied. In addition to the above-described filtering method, other methods may be of course applied at a need of those skilled in the art.

In accordance with an example embodiment of the present invention, the entity detecting part 123 may conduct a function of detecting an entity included in the image content and determining a type, a location, a size, etc. of the detected entity. The types of entities may be largely classified into persons including faces and other objects. During the detecting operation with respect to the entity included in the image content, the entity detecting part 123 may judge an entity to be a person by using at least one of various face detection technologies or to be an object by using at least one of diverse object detection technologies. The course of a face being detected by the entity detecting part 123 may be exemplarily explained as below. First, a skin color region is extracted from the image content and then the change of brightness of the extracted region is identified. By referring to the change of the brightness thereof, a contour is extracted. By judging whether two eyes and a mouth are respectively in the region of eyes and the region of a mouth empirically measured, the face may be detected. An empirical method means a process of detecting a face through learned patterns. After a tree-structured detector is made from simplified to complicated face patterns through a variety of cumulative face patterns, a face may be detected by filtering an entity included in the image content with the tree-structured detector. The method for detecting the face is an exemplary case and other methods, e.g., a method for detecting the face by matching the entity included in the image content serving as a subject for the trimming process with face sample image pre-stored on a database, may be applied.

A course of an object being detected by the entity detecting part 123 may be exemplarily explained as below. A difference of brightness between adjacent pixels in the image content or a difference of pixel values is measured and a set(s) of points which show the differences exceeding a prefixed threshold value is determined to be an edge(s) of the object. Based on this, the object and a background may be separated. For instance, a technology for separating a subject and a background from a photographed image described in Korean Patent Application No. 2009-0064247 (Method and Device for Taking Digital Image) will be applicable. For reference, as another example, it may be determined that the entity other than the face detected under the aforementioned method is an object.

In accordance with an example embodiment of the present invention, the frame designating part 124 may designate a frame as a region including an entity detected by the entity detecting part 123. It may perform a function of designating the frame only as a region including the selected entity under the certain standard and extracting the region as the distinctive region. Simply, if one entity is detected by the entity detecting part 123, a region including the entity is designated as a rectangular shape of a frame and extracted as the distinctive region. If two or more entities are detected, a region including the selected entity under the certain standard or a more limited region is designated as the frame and extracted as the distinctive region.

Figure 3A:
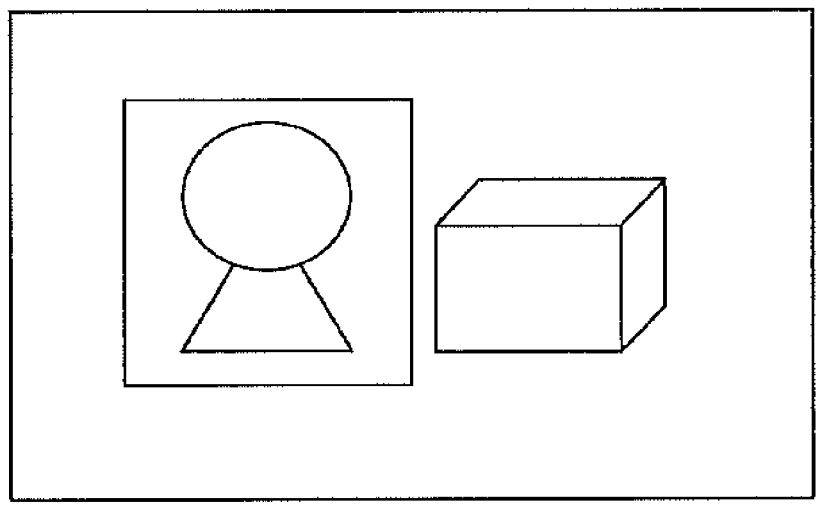
FIGS. 3A through 3N are drawings explaining processes of the distinctive regions being extracted by a frame designating part in accordance with an example embodiment of the present invention.
Figure 3B:
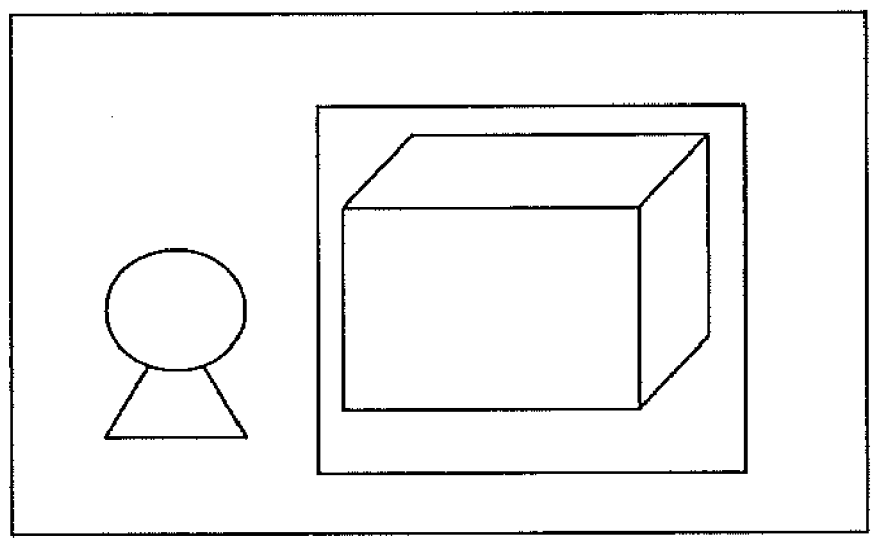
Figure 3C:
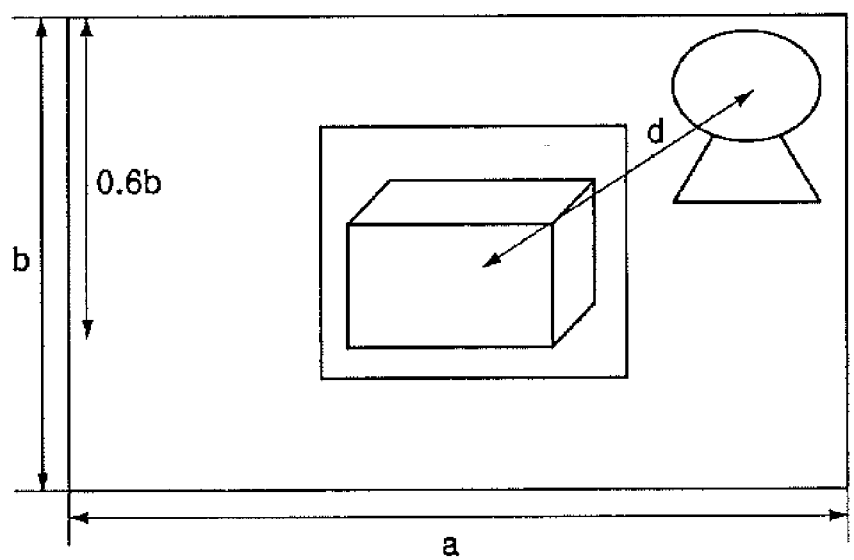
Figure 3D:
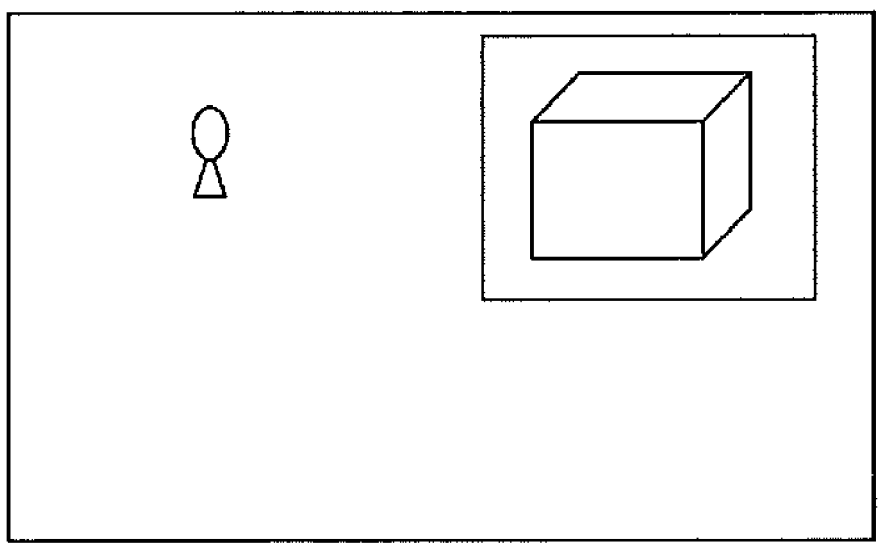
Figure 3E:
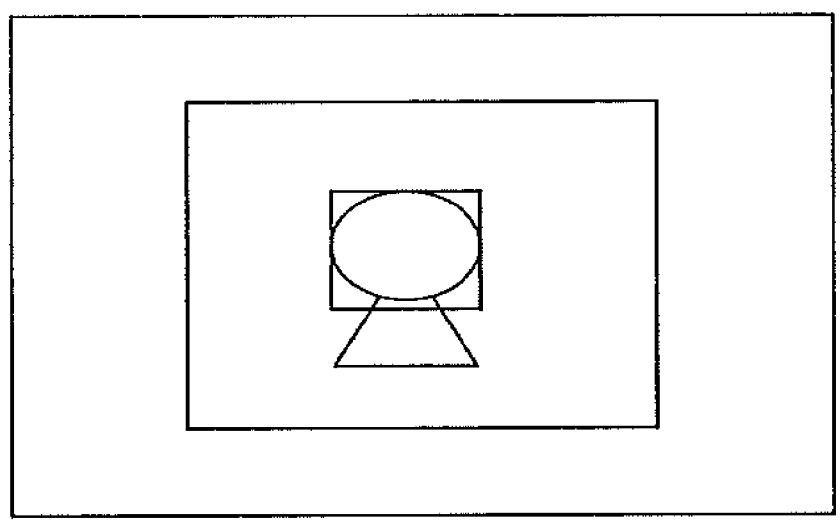
Figure 3F:
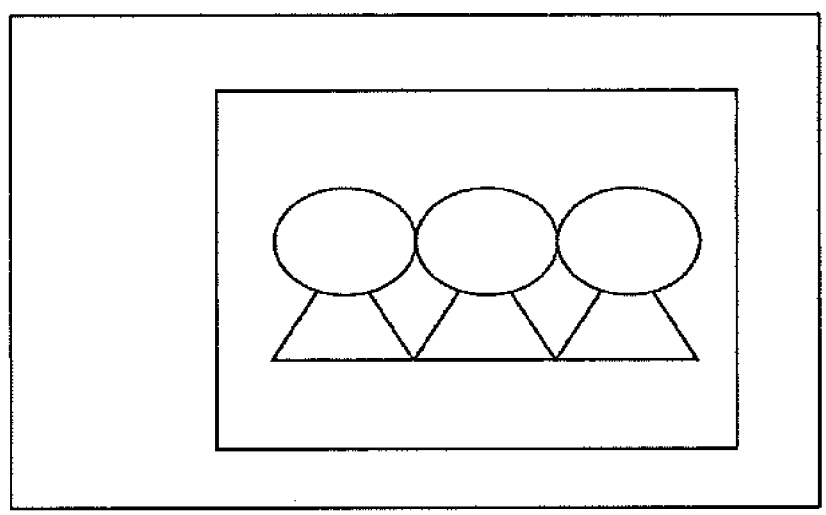
Figure 3G:
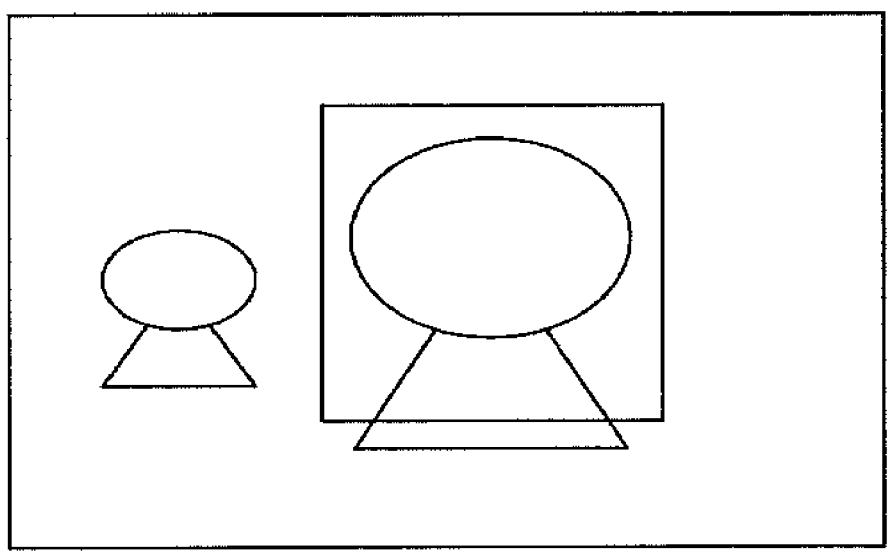
Figure 3H:
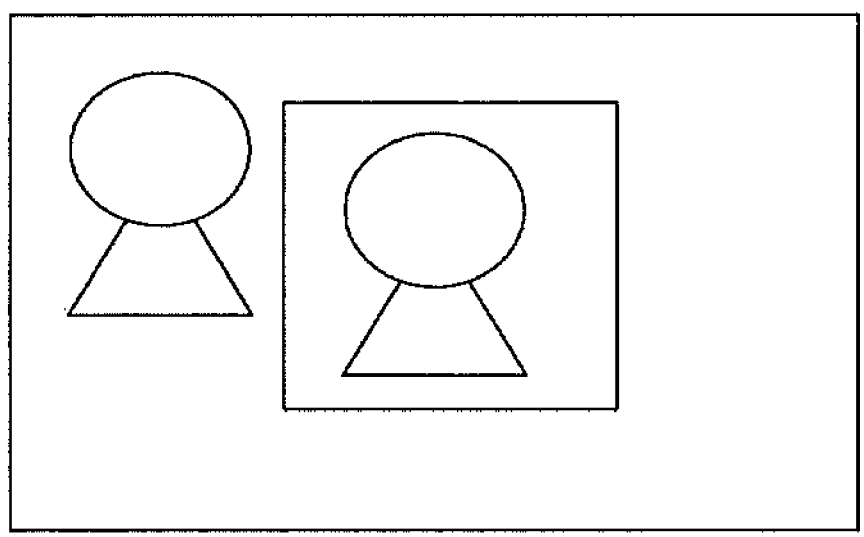
Figure 31:
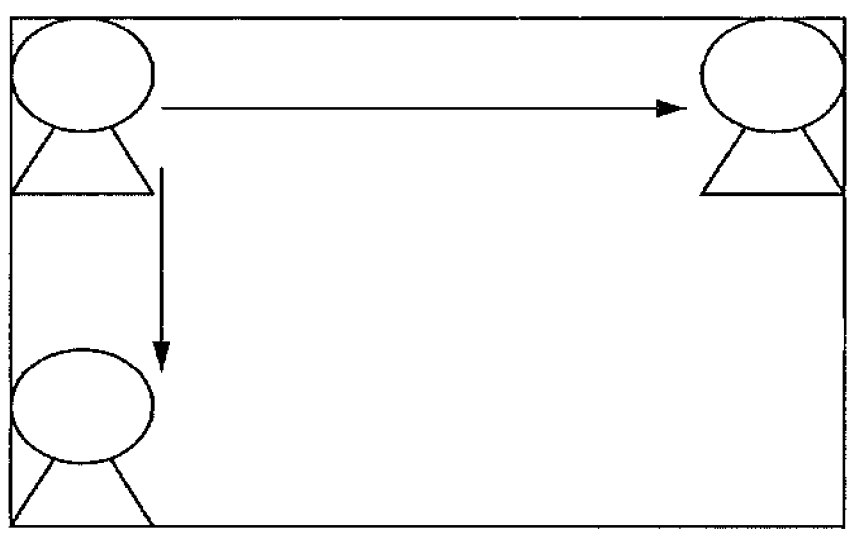
Figure 3J:
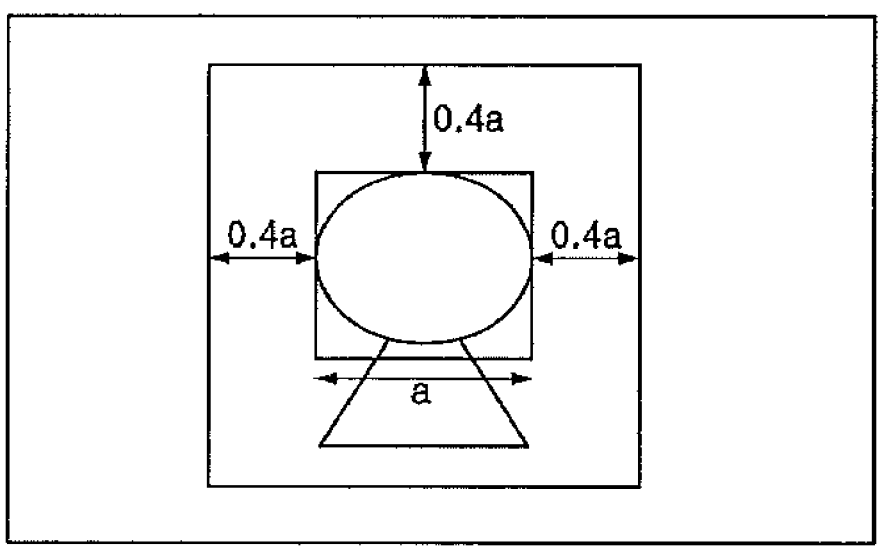
Figure 3K:
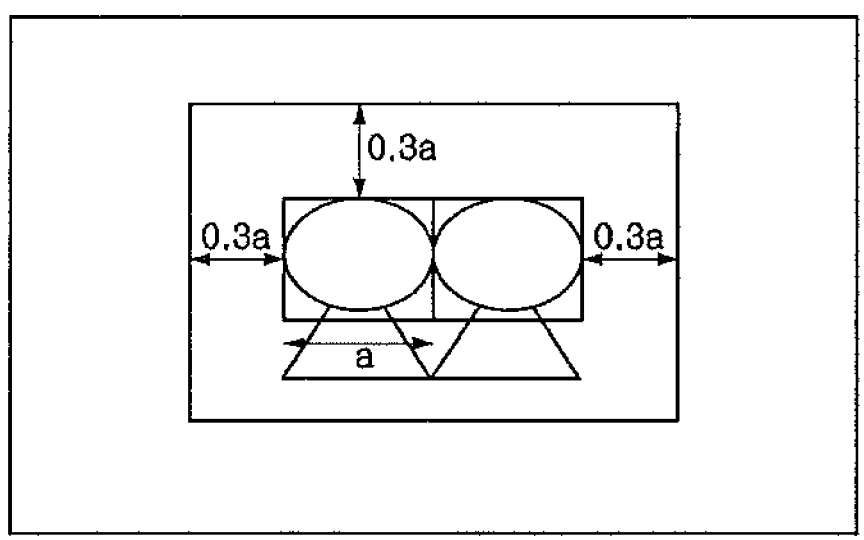
Figure 3L:
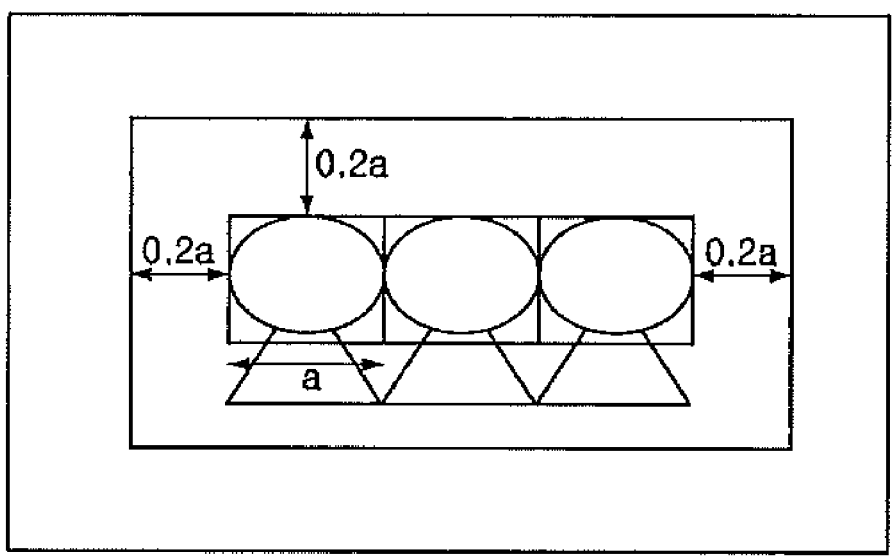
Figure 3M:
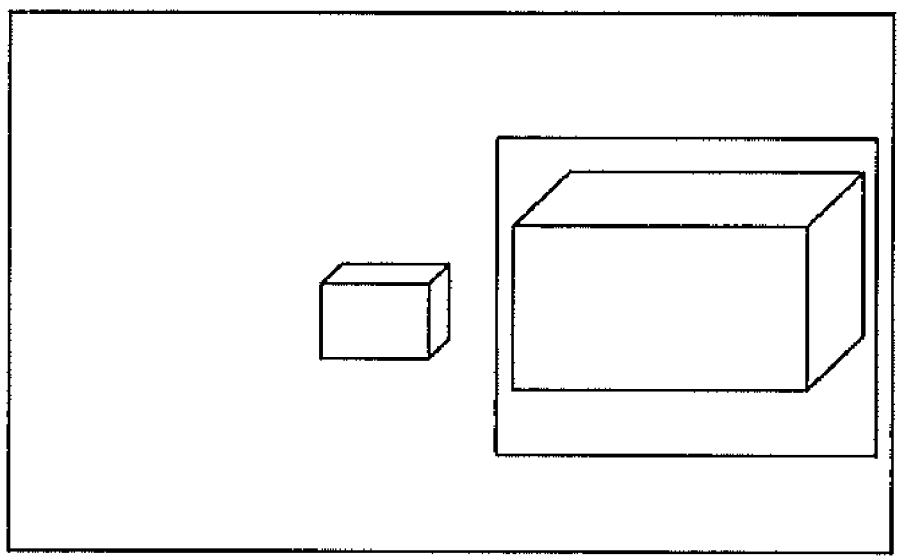
Figure 3N:
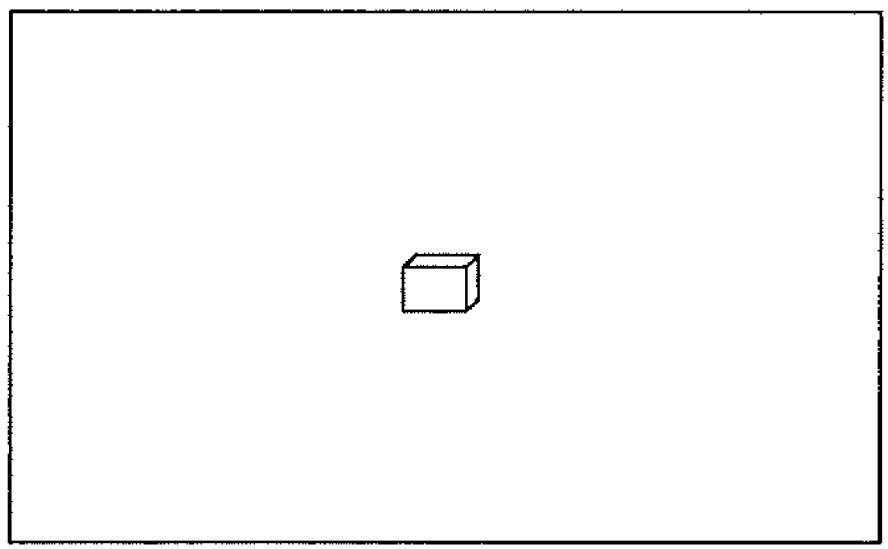

By referring to FIGS. 3A through 3N, various examples of a distinctive region(s) being extracted by the frame designating part 124 are explained in detail.

First, FIGS. 3A through 3D are diagrams to explain methods for extracting distinctive regions if the image contents are detected to include both a person and an object respectively as results of detection processes being performed by the entity detecting part 123.

As illustrated in FIG. 3A, if both a face and an object exist, a priority on the face, basically, is granted. Accordingly, a rectangular or more desirably square frame may be designated on a region including the face and the region may be extracted as the distinctive region. As illustrated in FIG. 3B, if a percent of an area of the object to that of the face exceeds a prefixed threshold value, a priority may be granted on the object. The area of the face and that of the object may be defined as the area of the minimum region including the face and the object, respectively, in a rectangular shape. For example, on assumption that the threshold value is defined as 6, if the area of the object is by over six times more than that of the face, a priority on the object will be able to be granted. Herein, the threshold value is not limited only to 6 but may be generalized as n. Accordingly, a region including the object may be designated as a frame and it may be extracted as a distinctive region. Herein, if the ratio of the area of the object to that of the image content exceeds certain percents (e.g., 80 percent), the whole image content may be extracted as a distinctive region.

Even though a face and an object exist at the same time, as illustrated in FIG. 3C, if the face is apparently around the edge of the image and the object is relatively on the center, a priority is placed on the object on the center and the region including the object may be extracted as a distinctive region. If a distance between a central point of an image content and a center of the face is longer than a certain percent of either a width or a height of the whole image content, which is shorter, the frame designating part 124 may determine the priority to be placed on the object as seen in the preceding case. For instance, the height "b" of the image content illustrated in FIG. 3C is shorter than the width "a" thereof. If the distance "d" between the central point of the image content and the center of the face is longer than a length corresponding to the certain percent, e.g., 60%, of the height "b", e.g., 0.6b, the detected face may be determined to be around the edge. Herein, the percent is not limited only to a numerical value 60% suggested as an example in the present invention and it will be able to reproduce the present invention by applying various examples. The center of the face may be determined by referring to information on a median value between a left-most pixel and a right-most pixel and that between an upper-most pixel and a bottom-most pixel based on an edge line(s) of a skin color region detected by the entity detecting part 123.

Furthermore, as illustrated in FIG. 3D, if a ratio of an area of a face entity included in an image to that of the image content is less than a certain ratio (e.g., 1/9), a process of extracting the face as a distinctive region may be omitted. At the time, if there exists an object in the image content, a region including the object may be extracted as a distinctive region and if no object exists, the whole image content may be extracted as a distinctive region or no distinctive region may be extracted.

Next, a course of extracting a distinctive region according to an area of a detected face is explained by referring to FIG. 3E. Only if a ratio of the area of the face included in the image content to that of the whole image content exceeds a certain standard, the frame designating part 124 may extract a face-centered distinctive region. In short, only if the face is determined to appear as an important part in the image content by applying a differential ratio (i.e., a ratio of the area of the face to that of the whole image content) according to an area of the face, the region including the face may be extracted as a distinctive region. For example, differential ratios may be applied in three steps. Firstly, incase the area of the face falls within a first scope (e.g., less than 2000 pixels), only if the ratio of the area of the face to that of the whole image content is larger than a first ratio (e.g., 1/50), the region including the face may be extracted as a distinctive region. Secondly, in case the area of the face falls within a second scope (e.g., larger than 2000 pixels and less than 5000 pixels), only if the ratio of the area of the face to that of the whole image content is larger than a second ratio (e.g., 1/30), the region including the face may be extracted as a distinctive region. Thirdly, in case the area of the face falls within a third scope (e.g., larger than 5000 pixels), only if the ratio of the area of the face to that of the whole image content is larger than a third ratio (e.g., 1/12), the region including the face may be extracted as a distinctive region. Herein, the area of the face may be expressed by multiplying the number of pixels in height by number of pixels in width of a square which has the smallest area among squares including a profile of the face. In addition, it is assumed in the aforementioned example that the resolution of the image content is 320×240 pixels but the scope may be changed according to the whole resolution of the image content.

If two or more faces are detected in an image by the entity detecting part 123, the frame designating part 124 may extract the distinctive region(s) under the following standard. Essentially, as illustrated in FIG. 3F, if the distances among the faces are nearer, the region including all the faces may be extracted as a distinctive region. For instance, if the distances among the faces are the length equal to less than three times of the length of the faces (e.g., a mean length of the faces), the region including all the faces may be extracted as a distinctive region. Furthermore, as represented in FIG. 3G, if the areas of the faces are significantly different by a percent exceeding a certain percent, only a region including a relatively larger face may be extracted as a distinctive region. For instance, if two faces exist it an image and an area of a face is by over six times larger than that of the other face, only an area including a larger face may be extracted as a distinctive region and if the area of the face is not by over six times larger than that of the other face, the region including all the two or more faces may be extracted as a distinctive region by using the method illustrated in FIG. 3F. As illustrated in FIG. 3H, if the areas of the faces are substantially same, a distinctive region may be extracted except a face around the edge. It may be assumed that 'the areas of the faces are same' means the differences of areas of faces are less than a certain percent (e.g., 10 percent). Whether each face is at the central point of the image content or around the edge may be determined by measuring each distance from the central point of each face to that of the image content and if a distance corresponding to a specific face is relatively shorter, the specific face may be determined to be around the central point. As illustrated in FIG. 3I, the faces which substantially have same areas are around edges of the image content, i.e., if no face is around the center of the image content, a priority may be placed on a face(s) around the left upper portion of the image content. If a face is at a location nearer to a specific point in the image content (e.g., the specific point around the right bottom portion of the image content) as well as on the left upper portion thereof, a higher priority may be placed on the face and only the region including the corresponding face may be also extracted as a distinctive region.

Simply, the region including the face on the left upper in the example illustrated in FIG. 3I may be extracted as a distinctive region.

The frame designating part 124 may differentially designate an area of the distinctive region to be extracted by referring to the number of faces detected by the entity detecting part 123. For example, the areas of the distinctive region may be adjusted in four steps. As illustrated in FIG. 3J, if one face is detected in the image content, the distinctive region may be enlarged by a first percent of either a width or a height of the face, which is longer. For instance, the distinctive region may be enlarged in a left, a right, an upper and a bottom directions of the face by a length equivalent to 40% of the width which is relatively longer and then the enlarged distinctive region may be extracted. In addition, as illustrated in FIGS. 3K and 3L, if two or three faces are detected in the image content, respective distinctive regions may be enlarged, respectively, by a second percent or a third percent of either the widths or the heights of the faces, which are longer. For example, the distinctive regions may be extracted by enlarging the areas of the faces, respectively by 30% and 20% of the widths which are relatively longer in a left, a right, an upper and a bottom directions of the areas of the faces. Even not illustrated in Figs., if there are four or more faces on the image, the enlargement ratio may be designated by 10%.

Furthermore, if no face is detected by the entity detecting part 123, i.e., if only an object(s) is detected, a distinctive region may be extracted in the following method:

First, an area only in a same color is excluded from a distinctive region. The area only in the same color does not mean an object but a wall, a ceiling or a simple background. Accordingly, the area may not be a distinctive region.

If two or more objects are detected, an object to be included in a distinctive region may be specified according to an area and a location of the object, as illustrated in FIG. 3M. A same method as the method for extracting a distinctive region(s) if there are two or more faces may be performed. In short, an area including a relatively larger object by comparing areas of the objects may be extracted as a distinctive region and a relatively higher priority may be placed on an object on the left upper portion of the image content according to locations of the objects. In addition, a region including the object with the highest priority or the certain number of objects in the order of highest priority may be also extracted as a distinctive region. As illustrated in FIG. 3N, if a ratio of an area of an object to that of a whole image content is less than a certain ratio (e.g., 1/9), the region including the object may not be extracted as a distinctive region and instead the whole image content may be extracted as a distinctive region or a distinctive region may not be extracted at all.

The aforementioned method is on assumption that a distinctive face or a distinctive object is clearly detected but if many indistinctive persons or indistinctive objects are detected or no face or no object is possible to detect, the whole image content will be extractable as a distinctive region.

In accordance with the present invention, since the distinctive regions of the image contents are extracted through several standards and users are provided with the extracted distinctive regions in a variety of forms including a thumbnail image form, a zoom function form, or a navigation/slide show form, the users may identify contents of multiple images more easily and enjoy a variety of image effects at the same time.

In accordance with the present invention, since different standards are applied according to types of entities included in the image contents, locations where the entities are placed in the images, areas which entities occupy, etc. and the distinctive regions of the image contents are extracted under such standards, substantially more significant parts will be extracted as the distinctive regions of the image contents than a method for extracting the distinctive region only through a simple arithmetic operation.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a compiler but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for applying a trimming operation to an image content, comprising the steps of:
   (a) detecting a person and an object in the image content by using a face detection technology and an object detection technology;
   (b) calculating an area of a face region of the detected person and an area of a region of the detected object, and calculating a distance between a central point of the face region of the detected person and a central point of the image content, and a distance between a central point of the detected object and the central point of the image content; and
   (c) applying the trimming operation to the object if the area of the region of the detected object is determined to be larger than that of the face region of the detected person by over a first prefixed percent, and applying the trimming operation to the object if the distance between the central point of the detected object and that of the image content is determined to be a second prefixed value or less and the distance between the central point of the face of the detected person and that of the image content is determined to be larger than the distance between the central point of the detected object and the central point of the image content by over a third prefixed value.

2. The method of claim 1, wherein, at the step (c), the trimming operation on the face is performed if the area of the region of the detected object is not determined to be larger than that of the face region of the detected person by over the first prefixed percent and the trimming operation on the face is performed if the distance between the central point of the face region of the detected person and that of the image content is determined to be a fourth prefixed value or less.

3. The method of claim 2, wherein, at the step (c), if the distance between the central point of the face region of the detected person and that of the image content is determined to correspond to a distance shorter than the shorter of that equal to a certain percent of either a width or a height of the image, the trimming operation on the face is performed.

4. The method of claim 2, wherein, at the step (c), a zoom-in or a zoom-out function on a face or an object selected by a user among the trimmed faces of the persons and the trimmed objects is performed.

5. The method of claim 2, wherein, at the step (c), a navigation function of looking around the trimmed face or the trimmed object selected by a user, is performed.

6. The method of claim 2, wherein, at the step (c), a slide show function of consecutively providing information on the trimmed face and the trimmed object automatically in a certain order, is performed.

7. The method of claim 1, the step (c) further includes the step of: performing a trimming operation on a top n faces or objects which are located nearer to a specific point of the image content among the faces of the detected persons and the detected objects if no object or face is on the center of the image content.

8. The method of claim 1, wherein the area of the region of the detected face or that of the detected object is an area of the region acquired by enlarging a minimal square including the face or the object in a left, a right, an upper and a bottom directions by a certain percent which is a percent of either the width or the height of the minimal square and the certain percent is differentially applied according to the number of persons or objects included in the image content.

9. The method of claim 1, wherein, at the step (c), if the area of the region of the detected face or that of the detected object is less than a certain percent of the area of the image content, the trimming operation on the whole image content is performed.

10. The method of claim 1, wherein, at the step (c), the step of performing the trimming operation includes that of creating a thumbnail.

11. A terminal for applying a trimming operation to an image content, comprising:
  a distinctive region extracting part for (i) detecting a person and an object in the image content by using a face detection technology and an object detection technology, (ii) calculating an area of a face region of the detected person and an area of a region of the detected object and calculating a distance between a central point of the face region of the detected person and a central point of the image content, and a distance between a central point of the detected object and the central point of the image content, and (iii) determining the region of the detected object as a distinctive region if the area of the region of the detected object is determined to be larger than that of the face region of the detected person by over a first prefixed percent, and determining the region of the detected object as a distinctive region if the distance between the central point of the detected object and that of the image content is determined to be a second prefixed value or less and the distance between the central point of the face of the detected person and that of the image content is determined to be larger than the distance between the central point of the detected object and the central point of the image content by over a third prefixed value;
  a trimming performing part for performing the trimming operation on the image content based on the determined distinctive region; and
  a display part for providing a result of the trimming operation for a user.

12. The terminal of claim 11, wherein the distinctive region extracting part determines the face region of the detected person as a distinctive region if the area of the region of the detected object is determined not to be larger than that of the face region of the detected person by over the first prefixed percent and determines the face region of the detected person as a distinctive region if the distance between the central point of the face of the detected person and that of the image content is determined to be a fourth prefixed value or less.

13. The terminal of claim 12, wherein the distinctive region extracting part determines the face region of the detected person as a distinctive region if the distance between the central point of the face of the detected person and that of the image content is determined to correspond to a distance shorter than a length equal to a certain percent of either a width or a height of the image, which is shorter.

14. The terminal of claim 12, wherein the trimming performing part includes a zoom function providing part for performing a zoom-in or a zoom-out function on a face or an object selected by a user among the trimmed faces of the persons and the trimmed objects.

15. The terminal of claim 12, wherein the trimming performing part performs a navigation function, as a function of looking around the trimmed face or the trimmed object selected by a user.

16. The terminal of claim 12, wherein the trimming performing part performs a slide show function, as a function of consecutively providing information on the trimmed face and the trimmed object automatically in a certain order.

17. The terminal of claim 11, wherein the distinctive region extracting part determines, as distinctive regions, a top n faces or objects which are located nearer to a specific point of the image content among the faces of the detected persons and the detected objects if no object or face is on the center of the image content.

18. The terminal of claim 11, wherein the area of the region of the detected face or that of the detected object is an area of the region acquired by enlarging a minimal square including the face or the object in a left, a right, an upper and a bottom directions by a certain percent which is a percent of either the width or the height of the minimal square and the certain percent is differentially applied according to the number of the persons or the objects included in the image content.

19. The terminal of claim 11, wherein the distinctive region extracting part includes a frame designating part for determining the whole image content as a distinctive region if the area of the region of the detected face or that of the detected object is less than a certain percent of the area of the image content.

20. The terminal of claim 11, wherein the trimming performing part includes a thumbnail creating part for creating a thumbnail image.

* * * * *